(12) United States Patent
Patel et al.

(10) Patent No.: US 7,599,312 B2
(45) Date of Patent: Oct. 6, 2009

(54) WITHDRAWING MULTIPLE ADVERTISED ROUTES BASED ON A QUERY DEFINED IN A WITHDRAW MESSAGE WHICH MAY BE OF PARTICULAR USE IN BORDER GATEWAY PROTOCOL

(75) Inventors: Keyur Patel, San Jose, CA (US); Chandrashekhar Appanna, Cupertino, CA (US); Robert Raszuk, Komorow (PL)

(73) Assignee: Cisco Technology, Inc., San Jose, CA (US)

( * ) Notice: Subject to any disclaimer, the term of this patent is extended or adjusted under 35 U.S.C. 154(b) by 538 days.

(21) Appl. No.: 11/077,776

(22) Filed: Mar. 11, 2005

(65) Prior Publication Data

US 2006/0203744 A1 Sep. 14, 2006

(51) Int. Cl.
*H04L 12/28* (2006.01)
*G06F 15/177* (2006.01)
(52) U.S. Cl. .................... 370/254; 370/256; 709/220
(58) Field of Classification Search ............... None
See application file for complete search history.

(56) References Cited

U.S. PATENT DOCUMENTS

| 6,636,895 | B1 | 10/2003 | Li et al. |
| 6,741,585 | B1 | 5/2004 | Munoz et al. |
| 7,031,311 | B2 | 4/2006 | MeLampy et al. |
| 7,072,303 | B2 * | 7/2006 | MeLampy et al. .......... 370/238 |
| 2002/0141343 | A1 | 10/2002 | Bays |
| 2002/0163884 | A1 | 11/2002 | Peles et al. |
| 2005/0025118 | A1 | 2/2005 | Hao et al. |
| 2005/0074003 | A1 | 4/2005 | Ball et al. |

OTHER PUBLICATIONS

Rekhter et al., A Border Gateway Protocol 4 (BGP-4), RFC 1771, IETF, Mar. 1995, all pages.*
Nalawade, BGP Update v2, Nov. 2003, IETF, all pages.*
Oracle, "Oracel(r) Text: Application Developer's Guide", Dec. 2003, Oracle, all pages.*
Wang, "NPLRI Storage Agggregation of BGP-4 Routing Information", 2002, IEEE, all pages.*
Rosenberg, "Telephony Routing over IP (TRIP)", Jan. 2002, all pages.*
Zinman, "Management Infomration Base for Telephony Routing over IP (TRIP)", Sep. 2004, IETF, all pages.*

(Continued)

*Primary Examiner*—Kwang B Yao
*Assistant Examiner*—Adam Duda
(74) *Attorney, Agent, or Firm*—The Law Office of Kirk D. Williams

(57) ABSTRACT

Routes are withdrawn based on a query defined in a withdraw message. One or more route update messages identifying multiple routes with associated attributes and Type-Length-Values (TLVs) are received, and a routing database is updated to include the routes and their associated attributes and TLVs. A particular message associated with a route withdraw operation is received, with the particular message including an indication of at least two specified values and an operator, with each of the specified values being an attribute or a TLV. One or more routes are withdrawn from the routing database matching a query defined based on the specified values and the operator. In one embodiment, each of said attributes is a Border Gateway Protocol attribute. One embodiment includes sending a message including an advertisement of supporting MP_AGGREGATE_WITHDRAW capability.

20 Claims, 3 Drawing Sheets

OTHER PUBLICATIONS

Tiwari, "Seminar Report Telephony Over IP", Kanwal Rekhi School of Information Technology, all pages.*

Schlesener, "performance Evaluation of Telephony Routing over IP (TRIP)", 2003, IEEE, all pages.*

U.S. Appl. No. 10/739,238, filed Dec. 18, 2003, Scudder et al.

Rekhter et al., A Border Gateway Protocol 4 (BGP-4), RFC 1771, IETF, Mar. 1995.

Rekhter et al., A Border Gateway Protocol 4 (BGP-4), draft-ietf-idr-bgp4-22, IETF working draft, Oct. 2003.

Chandra et al., BGP Communities Attribute, RFC 1997, IETF, Aug. 1996.

Chandra et al., Capabilities Advertisement with BGP-4, RFC 3392, IETF, Nov. 2002.

Sangli et al., BGP Extended Communities Attribute, draft-ietf-idr-bgp-ext-communities-06, IETF working draft, Aug. 2003.

* cited by examiner

US 7,599,312 B2

WITHDRAWING MULTIPLE ADVERTISED ROUTES BASED ON A QUERY DEFINED IN A WITHDRAW MESSAGE WHICH MAY BE OF PARTICULAR USE IN BORDER GATEWAY PROTOCOL

TECHNICAL FIELD

One embodiment of the invention relates to communications and computer systems, especially networked routers, packet switching systems, and other devices; and more particularly, one embodiment relates to withdrawing multiple advertised routes based on a query defined in a withdraw message, which may be of particular use in Border Gateway Protocol.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and shares routing information among other nodes of a network. Border Gateway Protocol (BGP) is a common protocol used to exchange routing information between subnetworks within the network. BGP is an inter-Autonomous System routing protocol. One version of it is described in A BORDER GATEWAY PROTOCOL 4 (BGP-4), RFC 1771, IETF, March 1995, which is hereby incorporated by reference. Another version is described in A BORDER GATEWAY PROTOCOL 4 (BGP-4), draft-ietf-idr-bgp4-22, IETF working draft, October 9003 which is hereby incorporated by reference. Some other documents which describe aspects of Border Gateway Protocol include: BGP COMMUNITIES ATTRIBUTE, RFC 1997, IETF, August 1996; CAPABILITIES ADVERTISEMENT WITH BGP-4, RFC 3392, IETF, November 2002; and BGP Extended Communities Attribute, draft-ietf-idr-bgp-ext-communities-06, IETF working draft, August 2003; with all of these documents being hereby incorporated by reference.

A primary function of a BGP speaking system is to exchange network reachability information with other BGP systems. This network reachability information includes information on the list of Autonomous Systems (ASs) that reachability information traverses. This information is sufficient to construct a graph of AS connectivity from which routing loops may be pruned and some policy decisions at the AS level may be enforced. To characterize the set of policy decisions that can be enforced using BGP, one must focus on the rule that a BGP speaker advertise to its peers (other BGP speakers which it communicates with) in neighboring ASs. Note, an Autonomous System typically refers to a set of routers under a single technical administration, using an interior gateway protocol and common metrics to route packets within the AS, and using an exterior gateway protocol to route packets to other ASs. It has also become common for a single AS to use several interior gateway protocols and sometimes several sets of metrics within an AS.

Communicating nodes initially exchange their entire BGP routing table, and then send incremental updates as the routing tables change. BGP does not require periodic refresh of the entire BGP routing table. Therefore, a BGP speaker must retain the current version of the entire BGP routing tables of all of its peers for the duration of the connection. KeepAlive messages are sent periodically to ensure the liveness of the connection. Notification messages are sent in response to errors or special conditions. If a connection encounters an error condition, a notification message is sent, the connection is closed and the routes associated with the connection are withdrawn from the routing tables.

A route may be viewed as a unit of information that pairs a destination with the attributes of a path to that destination. For example, a route may be considered to be a Network Layer Reachability Information (NLRI) with attributes to that NLRI/destination.

Routes are advertised between a pair of BGP speakers in Update messages, with the destination being the systems whose IP addresses are reported in the Network Layer Reachability Information (NLRI) field of the Update message, and the path is the information reported in the path attributes fields of the same Update message. Routes are stored in the Routing Information Bases (RIBs): namely, the Adj-RIBs-In, the Loc-RIB, and the Adj-RIBs-Out. Routes that will be advertised to other BGP speakers must be present in the Adj-RIB-Out; routes that will be used by the local BGP speaker must be present in the Loc-RIB, and the next hop for each of these routes must be present in the local BGP speaker's forwarding information base; and routes that are received from other BGP speakers are present in the Adj-RIBs-In.

If a BGP speaker chooses to advertise a route, it may add to or modify the path attributes of the route before advertising it to a peer. BGP provides mechanisms by which a BGP speaker can inform its peer that a previously advertised route is no longer available for use. There are three methods specified in RFC 1771 by which a given BGP speaker can indicate that a route has been withdrawn from service: the IP prefix that expresses destinations for a previously advertised route can be advertised in the withdrawn routes field in the Update message, thus marking the associated route as being no longer available for use; a replacement route with the same Network Layer Reachability Information can be advertised; and the BGP speaker to BGP speaker connection can be closed, which implicitly removes from service all routes which the pair of speakers had advertised to each other.

An Update message is used to advertise a single feasible route to a peer, or to withdraw multiple unfeasible routes from service. An Update message may simultaneously advertise a feasible route and withdraw multiple unfeasible routes from service. The Update message always includes the fixed-size BGP header, and can optionally include other fields including: Unfeasible Routes Length, Withdrawn Routes, Total Path Attribute Length, Path Attributes, and Network Layer Reachability Information.

The Unfeasible Routes Length field indicates the total length of the Withdrawn Routes field in octets.

The Withdrawn Routes field is a variable length field that contains a list of IP address prefixes for the routes that are being withdrawn from service. Each IP address prefix is encoded as a two-tuple of the form <length, prefix>, with the Length field indicating the length in bits of the IP address prefix, with a length of zero indicating a prefix that matches all IP addresses (with prefix, itself, of zero octets); and the Prefix field containing IP address prefixes followed by enough trailing bits to make the end of the field fall on an octet boundary. Note that the value of trailing bits is irrelevant.

The Total Path Attribute Length includes an unsigned integer indicating the total length of the Path Attributes field in octets. Its value must allow the length of the Network Layer Reachability field to be determined as specified below. A value of 0 indicates that no Network Layer Reachability Information field is present in this Update message.

The Path Attributes is a variable length sequence of path attributes and is present in every Update. Each path attribute is a triple<attribute type, attribute length, attribute value>of variable length.

The Network Layer Reachability Information field is a variable length field containing a list of IP address prefixes.

An Update message can advertise multiple routes, which may be described by several path attributes. All path attributes contained in a given Update messages apply to the destinations carried in the Network Layer Reachability Information field of the Update message.

An Update message can list multiple routes to be withdrawn from service. Each such route is identified by its destination (expressed as an IP prefix), which unambiguously identifies the route in the context of the BGP speaker—BGP speaker connection to which it has been previously been advertised. An Update message may advertise only routes to be withdrawn from service, in which case it will not include path attributes or Network Layer Reachability Information. Conversely, it may advertise only a feasible route, in which case the Withdrawn Routes field need not be present.

If the Update message contains a non-empty Withdrawn Routes field, the previously advertised routes whose destinations (expressed as IP prefixes) are contained in this field shall be removed from the Adj-RIB-In. This BGP speaker shall run its Decision Process since the previously advertised route is no longer available for use.

SUMMARY

Disclosed are, inter alia, methods, apparatus, data structures, computer-readable media, mechanisms, and means for withdrawing routes based on a query defined in a withdraw message. One embodiment receives one or more route update messages identifying multiple routes with associated attributes and/or Type-Length-Value (TLV) values, and updates a routing database to include the routes and their associated attributes and/or TLVs. A particular message associated with a route withdraw operation is received, with the particular message including an indication of at least two specified values and an operator (e.g., OR, AND, or one or more logical operations), with each of the specified values being an attribute or a TLV. One or more routes are withdrawn from the routing database matching a query defined based on the specified values and the operator. In one embodiment, each of said attributes is a Border Gateway Protocol attribute. One embodiment includes sending a message including an advertisement of supporting MP_AGGREGATE_WITHDRAW capability. In one embodiment, the operator identifies the query includes an OR operation between said specified values. In one embodiment, the operator identifies the query includes an AND operation between said specified values.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
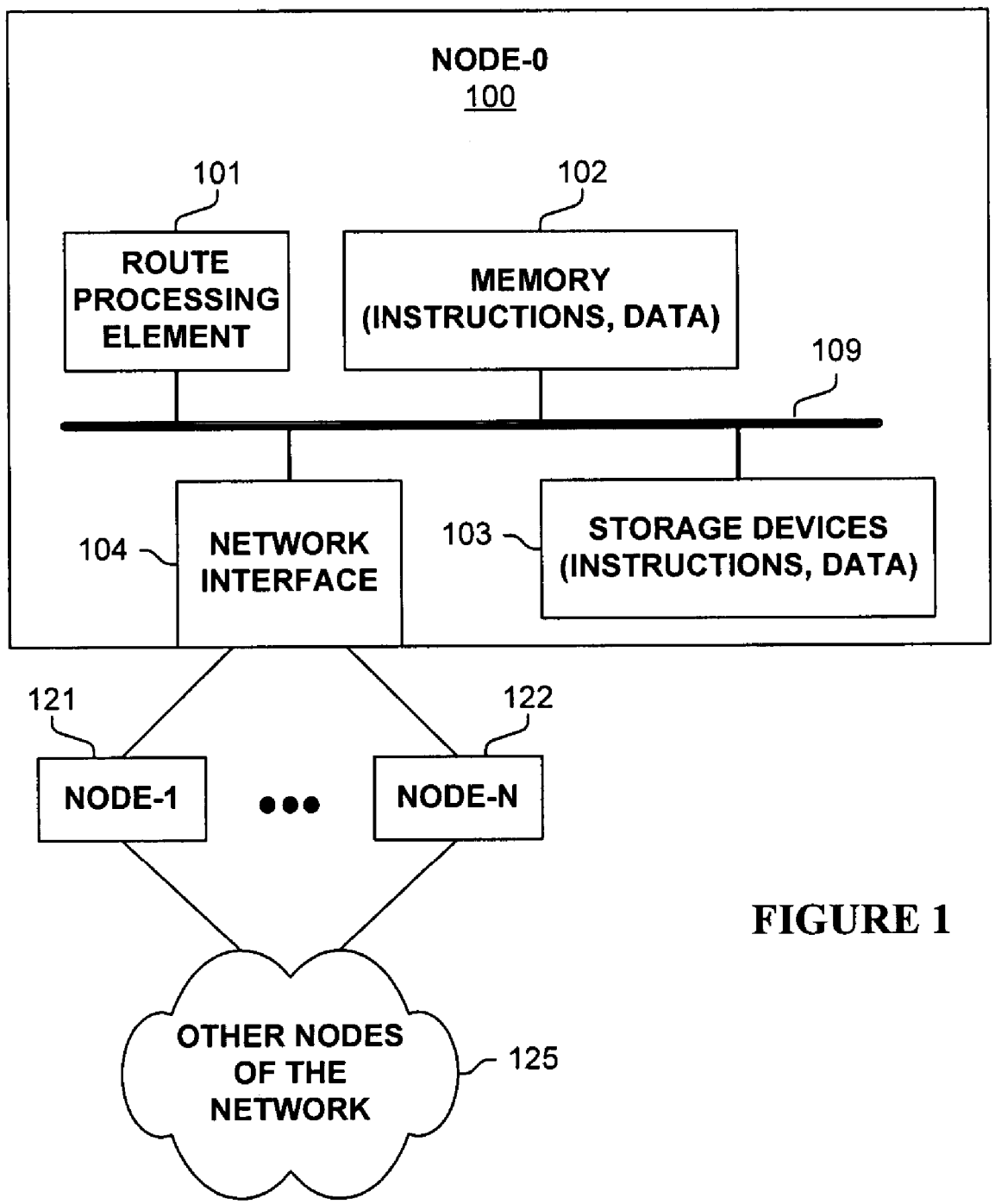
FIG. 1 is a block diagram of an exemplary system employing one embodiment.

Disclosed are, inter alia, methods, apparatus, data structures, computer-readable media, mechanisms, and means for withdrawing routes based on a query defined in a withdraw message, which may be of particular use in Border Gateway Protocol.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism tangibly embodying computer-readable instructions and/or data. The term "memory" includes any random access memory (RAM). read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternaly content addressable memories, hash tables, TRIE and other data structures, etc. Additionally, the term "associative memory unit" may include, but is not limited to one or more associative memory devices or parts thereof, including, but not limited to regions, segments. banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for withdrawing routes based on a query defined in a withdraw message. One embodiment receives one or more route update messages identifying multiple routes with associated attributes and/or Type-Length-Value (TLV) values, and updates a routing database to include the routes and their associated attributes and/or TLVs. A particular message associated with a route withdraw operation is received, with the particular message including an indication of at least two specified values and an operator (e.g., OR, AND, or one or more logical operations), with each of the specified values being an attribute or a TLV. One or more routes are withdrawn from the routing database matching a query defined based on the specified values and the operator. In one embodiment, each of said attributes is a Border Gateway Protocol attribute. One embodiment includes sending a message including an advertisement of supporting MP_AGGREGATE_WITHDRAW capability. In one embodiment, the operator identifies the query includes an OR operation between said specified values. In one embodiment, the operator identifies the query includes an AND operation between said specified values.

One embodiment receives one or more route update messages identifying multiple routes with associated attributes and updating a routing database to include the routes and their associated attributes. A particular message associated with a route withdraw operation is received, with the particular message including an indication a multiple attributes and an operator. One or more routes are then withdrawn from the routing database matching a query defined based on the attributes and the operator. In one embodiment, the particular message includes at least one Type-Length-Value (TLV) value, and the query is defined based on the at least one TLV, the attributes and the operation. In one embodiment, each of the attributes is a Border Gateway Protocol attribute. One embodiment includes sending a message including an advertisement of supporting MP_AGGREGATE_WITHDRAW capability. In one embodiment, the operator identifies the query includes an OR operation between the attributes. In one embodiment, the operator identifies the query includes an AND operation between the attributes.

One embodiment leverages the common properties (e.g., attributes, TLVs, etc.) of multiple prefix path changes and aggregates the change signal into one withdraw message identifying those routes matching a query containing the common property or properties that changed.

For example, when all the BGP sessions to all customer equipment in a VRF (VPN routing and forwarding) go down, all VRF routes are sent within an MP_UNREACH attribute which could be up to hundreds or thousands of prefixes. Instead of sending a separate message for the withdrawal of each route, a query can provided to identify the routes based on the RD (Route Distinguisher) and list of all export RTs (Route Target) for a given VRF. The receiving BGP peer would match on the BGP Attributes received and remove all the matching attribute routes received from the neighbor that sent the withdrawal message.

Also, for example, when a router wants to pull all routes based on a certain attribute property like a BGP COMMUNITY attribute or a BGP EXTENDED COMMUNITY attribute, a query can be defined to identify the common BGP COMMUNITY or BGP EXTENDED COMMUNITY, with this query included in a MP_AGGREGATE_WITHDRAW message causing these routes to be removed. Similarly, a query can be defined to identify those of a BGP NEXTHOP (and possibly associated other attributes and/or TLVs), with a withdraw message including the defined query causing the corresponding routes to be withdrawn.

A new BGP attribute MP_AGGREGATE_WITHDRAW is defined to allow BGP speakers to negotiate support for this feature—that ensures that two BGP speakers can send out AGGREGATE_WITHDRAW messages only to compatible speakers and generate regular withdraw messages to others. In one embodiment, this attribute includes the defined BGP NLRI properties (attributes) and also a TLV space for NLRI properties grouping based on non-attribute criteria. It allows BGP to withdraw multiple NLRIs in a single message by specifying one or more common properties (possibly with certain operators) used to determine these multiple NLRIs, thereby reducing significantly the load on routers, number and/or size of BGP update messages, and the convergence time. This is an optional non-transitive attribute.

A BGP speaker that receives an update message with MP_AGGREGATE_WITHDRAW should remove all the NLRIs (paths) that match the attribute and TLV list specified in the MP_AGGREGATE_WITHDRAW attribute for each AFI/SAFI. The matching of the attributes is further qualified by the operation type specified in the flags field associated with the AFI/SAFI and can be logical AND or OR, or other simple or complex logical operation. When the AND operation is specified, it means that only NLRI that have all the properties in the aggregate withdraw message should be deleted, and OR specified in a message implies any one or more of the properties. In addition to the attribute list as described above, a TLV can also be present in an AGGREGATE_WITHDRAW message. The presence of TLVs is indicated by a flag in the MP_AGGREGATE_WITHDRAW attribute. The TLV will always be a logical AND to all other attributes if present. The TLV space is used to encode NLRI properties such as Route Distinguisher (RD). As part of this solution a RD TLV has also been defined because in VPN networks we believe that this is a very useful grouping.

A new BGP Extended Community called Aggregate Withdraw Extended Community is also defined in one embodiment. This extended community is used to group NLRI with properties that cannot be grouped based on existing BGP attributes but have common fate sharing properties. Such grouping could be based on arbitrary ISP policy. In the event of an AFI/SAFI being in the AGGREGATE_WITHDRAW attribute that is not supported as per the initial capability negotiation, a BGP Notification message with the notification code set to UNSUPPORTED_AFI_SAFI should be sent and the session should be terminated.

In one embodiment, BGP speaker that receives an UPDATE message with MP_AGGREGATE_WITHDRAW and does not support MP_AGGREGATE_WITHDRAW capability, it drops the session and logs a warning message.

FIG. 1 is a block diagram of an exemplary system employing one embodiment. Illustrated therein are multiple nodes 100, 121-122, and 125 of a network, with at least two of these nodes supporting withdrawing routes based on a query defined in a withdraw message. A node 100, 121-122, and 125 can be a router or any other networked device.

In one embodiment, node 100 includes a processing element 101, memory 102, storage devices 103, and an interface 104 for receiving and sending packets, items, and/or other information, which are typically coupled via one or more communications mechanisms 109 (shown as a bus for illustrative purposes.) Various embodiments of node 100 may include more or less elements, such as, but not limited to, specialized hardware (e.g., one or more associative memories) for storing routes and performing the routing queries.

The operation of node 100 is typically controlled by processing element 101 using memory 102 and storage devices 103 to perform one or more scheduling tasks or processes. Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated by processing element 101 for implementing functionality in accordance with the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with the invention.

Figure 2:
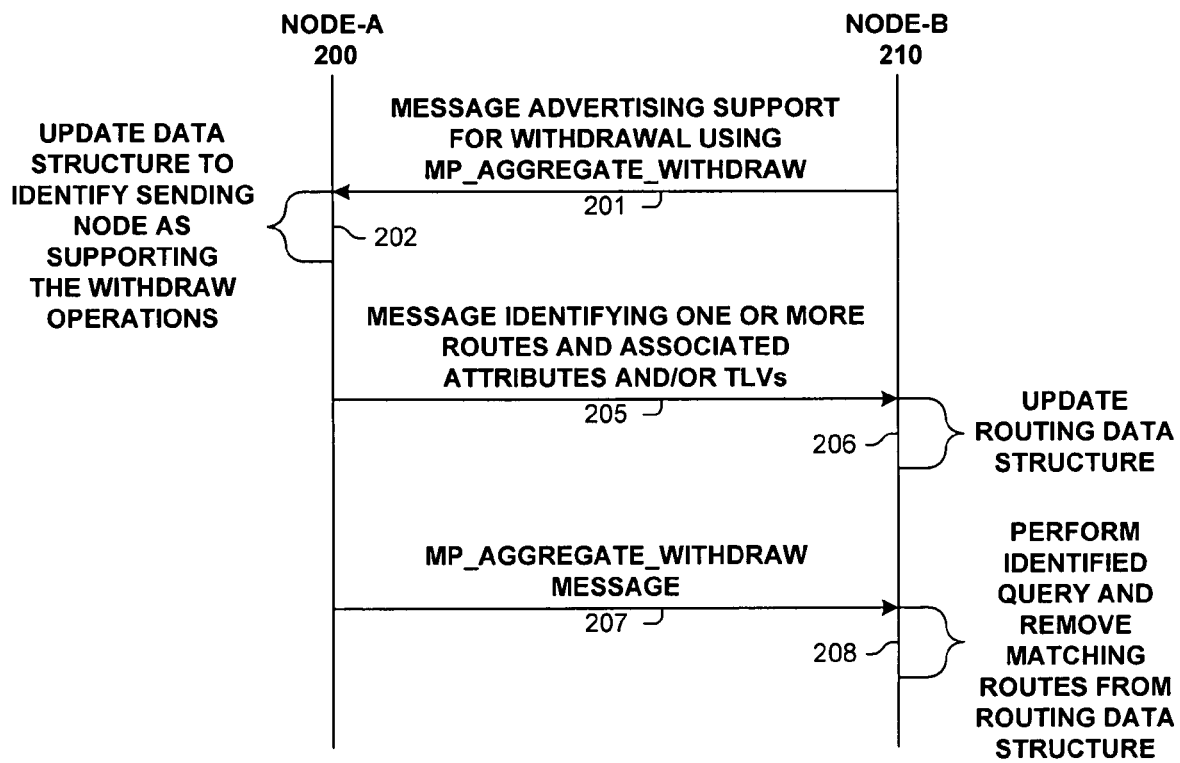
FIG. 2 is a block diagram illustrating messages sent and actions taken in one embodiment.

FIG. 2A is a block diagram illustrating messages sent and actions taken in one embodiment. Shown in FIG. 2A is the processing and sending of messages between node-A 200 and node-B 210.

Typically, a node-B 210 will advertise to other nodes its capability to support withdrawing routes based on a query defined in a withdraw message, especially in a heterogeneous network where some devices support this feature and some devices do not. It is expected that should this feature be pervasive or otherwise readily supported, there will no longer be the need to advertise this capability as it will be inherent and possibly provided for in a future specification of a protocol. As shown, node-B 210 sends message 201 advertising its support for withdrawing routes based on a query defined in a withdraw message. In one embodiment, in response to message 201, node-A 200 updates one or more data structures to identify that node-B 210 supports withdrawing routes based on a query defined in a withdraw message.

At some point in time, node-A 200 sends a message 205 which is received by node-B 210. Message 205 identifies one or more routes and their associated attributes and/or TLVs. Note, this association message 205 may or may not be the same message that advertises the routes to node-B 210. In response, node-B 210 updates one or more data structures with the routes and their associated attributes and/or TLVs, and if the routes were advertised, typically processes these route advertisements as normal.

Node-A, at some point typically later in time, sends a message 207 to node-B 210 which includes an indication to withdraw the one or more routes identified by the query defined in the withdraw message. In response, node-B 210 performs (208) the query defined in the withdraw message to identify the matching routes and withdraws them from the routing data structure.

Figure 3:
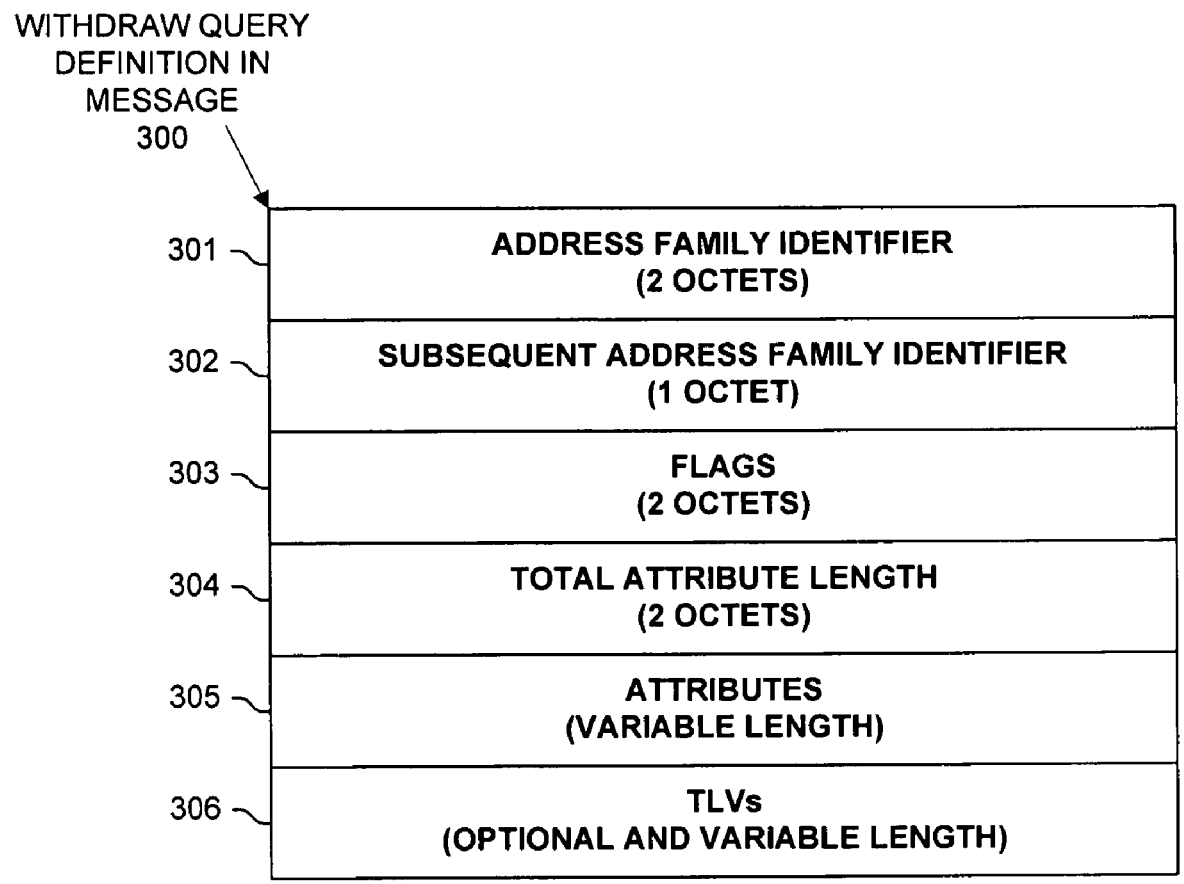
FIG. 3 is a block diagram of fields of a withdraw message used in one embodiment.

FIG. 3 is a block diagram of illustrating a withdraw query definition 300 included in a withdraw message used in one embodiment. As shown, withdraw query definition 300 includes an address family identifier field 301, a subsequent address family identifier field 302, flags field 303, total attribute length field 304, attributes field 305, and TLVs field 306. Address family identifier field 301 includes the identity of the Network Layer protocol associated with the NLRI that follows, such as the values specified in RFC 1700. Subsequent address family identifier field 302 provides additional information about the type of the Network Layer Reachability Information carried in the attribute. Flags field 303 indicates flags value (e.g., an unsigned integer) for the MP_AGGREGATE_WITHDRAW. The flags are defined as: 0x01—withdraw paths that match all attributes, 0x02—withdraw paths that match any one or more attributes, and 0x04 set to one only when TLVs are present. Total attribute length field 304 (e.g., an unsigned integer) indicates the total length of the path Attributes field 305, which allows the length of the Network Layer Reachability field to be determined as specified below. A value of zero indicates that neither the Network Layer Reachability Information field, nor the Path Attribute field is present in this UPDATE message. Attributes field 305 specifies the attributes (e.g., those described in the RFCs) that are used in the query being defined. TLVs field 306 provides a mechanism to identify information to be used in a query alone or in conjunction with one or more specified attributes. For example, a Route Distinguisher TLV is defined for use in conjunction with VPNs (e.g., see RFC 2547) for identifying VPNs to identified in the query. Of course an unlimited number of variations or different messages are possible.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a node in a network for withdrawing routes, the method comprising:
    receiving, by the node, one or more route update messages identifying a plurality of routes with associated attributes or Type-Length-Values (TLVs) and updating a routing database in the node to include the plurality of routes associated with their said associated attributes or TLVs;
    receiving, by the node, a particular message associated with a route withdraw operation, the particular message including two specified values and a value defining an operator, with each of said two specified values being an attribute or a TLV;
    performing, by the node in response to said receiving the particular message, a query on the routing database to identify one or more particular routes of the plurality of routes in the routing database, with the operator defining for the query the matching requirements of said two specified values against attributes or TLVs associated with routes in the routing database; and
    withdrawing, by the node, said one or more particular routes from the routing database said identified by the query said performed on the routing database.

2. The method of claim 1, wherein each of said two specified values is a Border Gateway Protocol including a triple including attribute type, attribute length, and attribute value.

3. The method of claim 1, comprising sending a message including an advertisement of supporting MP_AGGREGATE_WITHDRAW capability to a particular node in the network from which the particular message is subsequently received.

4. The method of claim 1, wherein the operator identifies that the query includes an OR operation between said two specified values causing said one or more particular routes to include routes in the routing database associated with at least one of said two specified values.

5. The method of claim 1, wherein the operator identifies that the query includes an AND operation between said two specified values causing said one or more particular routes to include routes in the routing database associated with both of said two specified values.

6. A method performed by a node in a network for withdrawing routes, the method comprising:
    receiving, by the node, one or more route update messages identifying a plurality of routes with associated attributes and updating a routing database in the node to include the plurality of routes associated with their said associated attributes;
    receiving, by the node, a particular message associated with a route withdraw operation, the particular message including a plurality of attributes and a value defining an operator defining a relationship between the plurality of attributes for use in withdrawing one or more routes from the routing database;

performing, by the node in response to said receiving the particular message, a query, identified by the plurality of attributes and the operator, on the routing database to identify one or more particular routes of the plurality of routes in the routing database, with the operator defining for the query the matching requirements of the plurality of attributes against attributes associated with routes in the routing database; and withdrawing, by the node, said one or more particular routes from the routing database said identified by the query said performed on the routing database.

7. The method of claim 6, wherein each of the plurality of attributes is a Border Gateway Protocol attribute, wherein each of said attributes is a triple including attribute type, attribute length, and attribute value.

8. The method of claim 6, comprising sending a message including an advertisement of supporting MP_AGGREGATE_WITHDRAW capability to a particular node in the network from which the particular message is subsequently received.

9. The method of claim 6, wherein the operator identifies that the query includes an OR operation between the plurality of attributes causing said one or more particular routes to include routes in the routing database associated with at least one of the plurality of attributes.

10. The method of claim 6, wherein the operator identifies the query includes an AND operation between the plurality of attributes causing said one or more particular routes to include routes in the routing database associated with all of the plurality of attributes.

11. The method of claim 6, wherein the particular message includes at least one Type-Length-Value (TLV), and the query is defined based on the at least one TLV, the plurality of attributes and the operation.

12. An apparatus for withdrawing routes, the apparatus comprising:

means for receiving one or more route update messages identifying a plurality of routes with associated attributes or Type-Length-Values (TLVs) and updating a routing database to include the plurality of routes associated with their said associated attributes or TLVs;

means for receiving a particular message associated with a route withdraw operation, the particular message including two specified values and a value defining an operator, with each of said two specified values being an attribute or a TLV;

means for performing, by the node in response to said receiving the particular message, a query on the routine database to identify one or more particular routes of the plurality of routes in the routing database, with the operator defining for the query the matching requirements of said two specified values against attributes or TLVs associated with routes in the routing database; and means for withdrawing one or more particular routes from the routing database said identified by the query said performed on the routing database.

13. The apparatus of claim 12, wherein each of said two specified values is a Border Gateway Protocol including a triple including attribute type, attribute length, and attribute value.

14. The apparatus of claim 12, comprising means for sending a message including an advertisement of supporting MP_AGGREGATE_WITHDRAW capability to a particular node in the network from which the particular message is subsequently received.

15. The apparatus of claim 12, wherein the operator identifies that the query includes an OR operation between said specified values causing said one or more particular routes to include routes in the routing database associated with at least one of said two specified values.

16. The apparatus of claim 12, wherein the operator identifies that the query includes an AND operation between said two specified values causing said one or more particular routes to include routes in the routing database associated with both of said two specified values.

17. The method of claim 1, wherein each of said two specified values is an attribute that is a triple including attribute type, attribute length, and attribute value.

18. An apparatus comprising one or more processors and memory, wherein the memory stores one or more instructions that, when executed by said one or more processors, perform operations comprising:

updating a routing database to include a plurality of routes associated with their associated attributes or Type-Length-Value (TLVs) received in one or more route update messages identifying the plurality of routes with said associated attributes or TLVs; and withdrawing one or more routes from the routing database in response to (1) a received particular message associated with a route withdraw operation, the particular message including a specified operator and at least two specified values, with each of said at least two specified values being an attribute or a TLV, and (2) a query defined based on said at least two specified values and said specified operator to identify said one or more routes whose said associated attributes or TLV's said included in the routing database match the query; wherein said specified operator defines for the query the matching requirements of said at least two specified values against attributes or TLVs associated with routes in the routing database.

19. The apparatus of claim 18, wherein each of said at least two specified values is an attribute that is a triple including attribute type, attribute length, and attribute value.

20. The apparatus of claim 18, wherein the operator identifies that the query includes an AND operation between said at least two specified values causing said one or more routes to include routes in the routing database associated with all of said at least two specified values.

* * * * *

UNITED STATES PATENT AND TRADEMARK OFFICE
CERTIFICATE OF CORRECTION

PATENT NO. : 7,599,312 B2 Page 1 of 1
APPLICATION NO. : 11/077776
DATED : October 6, 2009
INVENTOR(S) : Patel et al.

It is certified that error appears in the above-identified patent and that said Letters Patent is hereby corrected as shown below:

Col. 1, line 43, replace "October 9003" with -- October 2003 --

Col. 5, line 48, replace "andlor" with -- and/or --

Col. 5, line 59, replace "andlor" with -- and/or --

Col. 6, line 6, replace "ternaly" with -- ternary --

Col. 6, line 10, replace "segments." with -- segments, --

Col. 11, Claim 12, line 52, replace "routine" with -- routing --

Col. 12, Claim 12, line 1, replace "withdrawing one" with -- withdrawing said one --

Col. 12, Claim 15, lines 14-15, replace "said specified" with -- said two specified --

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,599,312 B2
APPLICATION NO. : 11/077776
DATED : October 6, 2009
INVENTOR(S) : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this

Twenty-eighth Day of September, 2010

David J. Kappos
*Director of the United States Patent and Trademark Office*